(12) United States Patent
Konradi et al.

(10) Patent No.: US 8,728,455 B2
(45) Date of Patent: May 20, 2014

(54) RADIATION-CURABLE ANTIMICROBIAL COATINGS

(71) Applicant: BASF SE, Ludwigshafen (DE)

(72) Inventors: Rupert Konradi, Ladenburg (DE);
Reinhold Schwalm, Wachenheim (DE);
Catharina Hippius, Mannheim (DE);
Sunghee Son, Mannheim (DE);
Christina Haaf, Hemsbach (DE);
Herbert Platsch, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/747,726

(22) Filed: Jan. 23, 2013

(65) Prior Publication Data

US 2013/0196075 A1    Aug. 1, 2013

Related U.S. Application Data

(60) Provisional application No. 61/591,289, filed on Jan. 27, 2012, provisional application No. 61/591,292, filed on Jan. 27, 2012, provisional application No. 61/684,163, filed on Aug. 17, 2012.

(51) Int. Cl.
*C09D 5/16* (2006.01)

(52) U.S. Cl.
USPC ...................................... 424/78.36; 427/496

(58) Field of Classification Search
None
See application file for complete search history.

(56) References Cited

U.S. PATENT DOCUMENTS

| | | | |
|---|---|---|---|
| 4,596,678 A | 6/1986 | Merger et al. | |
| 4,596,679 A | 6/1986 | Hellbach et al. | |
| 5,087,739 A | 2/1992 | Bohmholdt et al. | |
| 2006/0009589 A1 | 1/2006 | Haering et al. | |
| 2012/0244095 A1 | 9/2012 | Konradi et al. | |

FOREIGN PATENT DOCUMENTS

| | | |
|---|---|---|
| DE | 33 16 593 A1 | 11/1984 |
| DE | 197 00 081 A1 | 7/1998 |
| DE | 198 26 712 A1 | 12/1999 |
| DE | 199 13 353 A1 | 9/2000 |
| DE | 199 21 904 A1 | 11/2000 |
| DE | 199 57 900 A1 | 6/2001 |
| DE | 100 13 186 A1 | 9/2001 |
| DE | 100 13 187 A1 | 10/2001 |
| EP | 0 054 105 A1 | 6/1982 |
| EP | 0 092 269 A1 | 10/1983 |
| EP | 0 126 299 A1 | 11/1984 |
| EP | 0 126 300 A1 | 11/1984 |
| EP | 0 279 303 A2 | 8/1988 |
| EP | 0 355 443 A2 | 2/1990 |
| EP | 0 680 985 A1 | 11/1995 |
| WO | WO 98/33761 | 8/1998 |
| WO | WO 00/39183 | 7/2000 |
| WO | WO 2006/005491 A1 | 1/2006 |
| WO | WO 2007/090755 A1 | 8/2007 |
| WO | WO 2008/031596 A1 | 3/2008 |
| WO | WO 2008/131715 A1 | 11/2008 |
| WO | WO 2008/132045 A2 | 11/2008 |
| WO | WO 2012/123273 A1 | 9/2012 |
| WO | WO 2012/127009 A1 | 9/2012 |

OTHER PUBLICATIONS

U.S. Appl. No. 13/750,544, filed Jan. 25, 2013, Schwalm, et al.
U.S. Appl. No. 13/747,778, filed Jan. 23, 2013, Schwalm, et al.
Alexandra Munoz-Bonilla, et al., "Polymeric materials with antimicrobial activity", Progress in Polymer Science 37, (Elsevier), 2012, pp. 281-339.

*Primary Examiner* — Aradhana Sasan
*Assistant Examiner* — Danah Al-Awadi
(74) *Attorney, Agent, or Firm* — Oblon, Spivak, McClelland, Maier & Neustadt, L.L.P.

(57) ABSTRACT

The present invention relates to radiation-curable antimicrobial coatings, to a process for preparation thereof, and to the use thereof.

20 Claims, No Drawings

RADIATION-CURABLE ANTIMICROBIAL COATINGS

The present invention relates to radiation-curable antimicrobial coatings, to a process for preparation thereof, and to the use thereof.

WO 2008/131715 discloses silane-functional reaction products of diols with isocyanatopropyl-triethoxysilane which lead in coating compositions to easy-clean coatings.

WO 2008/132045 describes compounds which carry at least one quaternary ammonium group and at least one (meth)acrylate group. Compounds of this kind are used in radiation-curable coating compositions and lead to biocidal coatings.

WO 2008/31596 describes coating compositions for producing radiation-curable medical coatings, in which hydrophilic polyfunctional (meth)acrylamides are used. In order to acquire antimicrobial properties, it is necessary to add compounds with antimicrobial activity to these coating compositions.

The unpublished European Patent application with the file number 12152865.7 and the filing date Jan. 27, 2012, discloses radiation curable coatings comprising at least one hydrophilic reactive diluent and at least one component bearing at least one quaternary ammonium group.

The unpublished European Patent application with the file number 12152867.3 and the filing date Jan. 27, 2012, discloses radiation curable coatings comprising at least one hydrophilic reactive diluent and at least one urethane (meth)acrylate bearing at least one quaternary ammonium group.

Need for further coatings with antimicrobial activity exists.

DE 19921904 discloses compounds for antimicrobial coating compositions that have silyl groups and (meth)acrylate groups.

DE 19700081 discloses radiation-curable, antimicrobial coating compositions comprising silylated (meth)acrylates, cinnamoylethyl (meth)acrylate, other radiation-curable monomers, such as (meth)acrylates, for example, and also ammonium compounds. A disadvantage is that the effect of the antimicrobial coating compositions is relatively weak and derives predominantly only from an antiadhesive effect rather than a biocidal effect.

It was an object of the present invention to provide radiation-curable coatings which can be equipped with a rapid and complete or near-complete antimicrobial activity and which at the same time produce coatings having good film properties.

This object has been achieved by antimicrobial, radiation-curable coatings obtained by reacting (X) at least one 3-vinyl-imidazol-1-ium compound having the formula

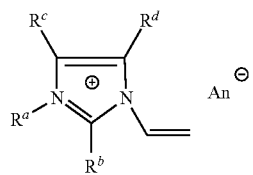

in which $R^a$ is an organic radical having 1 to 22 C atoms, $R^b$, $R^c$ and $R^d$ independently of one another are an H atom or an organic radical having up to 22 C atoms and An– is an anion, (A) optionally at least one urethane (meth)acrylate comprising
  at least one (meth)acrylate group and
  optionally at least one quaternary ammonium group, substituted by four radicals which have in total at least 12 carbon atoms,
(B) optionally at least one hydrophilic reactive diluent,
(C) optionally at least one reactive diluent other than (B),
(D) optionally at least one photoinitiator, and
(E) optionally at least one other coatings additive, wherein at least one of the components (A) and (B) is present, preferably both components (A) and (B), very preferably components (A), (B), and (D), and especially preferably components (A), (B), (D), and (E).

The radiation-curable, antimicrobial coatings of the invention exhibit a strong and rapid antimicrobial activity which persists over a relatively long time, and at the same time the coatings obtained therewith exhibit good film properties, especially hardness.

(X) 3-Vinyl-imidazol-1-ium compound

Compound (X) is at least one, for example, one to three, preferably one to two, and more preferably precisely one 3-vinyl-imidazol-1-ium compound of the formula

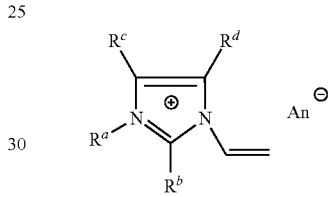

in which $R^a$ is an organic radical having 1 to 22 C atoms, $R^b$, $R^c$ and $R^d$ are independently of one another an H atom or an organic radical having up to 22 C atoms, and An⁻ is an anion.

$R^a$ is an organic radical having 1 to 22 C atoms. The organic radical may also comprise further heteroatoms, more particularly oxygen atoms, nitrogen, sulfur or phosphorus atoms, or functional groups, as for example hydroxyl groups, ether groups, ester groups, or carbonyl groups.

More particularly $R^a$ is a hydrocarbon radical which apart from carbon and hydrogen may further comprise at most hydroxyl groups, ether groups, ester groups or carbonyl groups.

$R^a$ with particular preference is a hydrocarbon radical having 1 to 22 C atoms, more particularly having 4 to 20 C atoms, which comprises no other heteroatoms, e.g., oxygen or nitrogen. The hydrocarbon radical may be aliphatic (in which case unsaturated aliphatic groups are also included, but less preferred) or aromatic, or may comprise both aromatic and aliphatic groups. Preferably $R^a$ is an aliphatic hydrocarbon radical.

Examples of hydrocarbon radicals include the phenyl group, benzyl group, a benzyl group or phenyl group substituted by one or more $C_1$ to $C_4$ alkyl groups, or the mesityl group, alkyl groups and alkenyl groups, more particularly the alkyl group.

With very particular preference $R^a$ is a $C_4$ to $C_{22}$ alkyl group, preferably a $C_4$ to $C_{18}$.

Examples for $R^a$ are methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2- pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl, dodecyl, tridecyl, tetradecyl, pentadecyl, hexadecyl, heptadecyl, octadecyl, nonadecyl, icosyl, phenylmethyl (benzyl), diphenylmethyl, triphenylmethyl, 2-phenylethyl, 3-phenylpropyl, cyclopentylmethyl, 2-cyclopentylethyl, 3-cyclopentylpropyl, cyclohexylmethyl, 2-cyclohexylethyl, and 3-cyclohexylpropyl.

With very particular preference $R^a$ is a 1-butyl, 2-butyl, 2-methyl-1-propyl (isobutyl), 2-methyl-2-propyl (tert-butyl), 1-pentyl, 2-pentyl, 3-pentyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl, dodecyl, tridecyl, tetradecyl, pentadecyl, hexadecyl, heptadecyl, octadecyl, nonadecyl, or icosyl group, with the butyl, pentyl, hexyl, octyl, decyl, dodecyl, tetradecyl, hexadecyl, and octadecyl groups having particular importance.

In one preferred embodiment $R^b$ is an H atom.

In another preferred embodiment $R^b$ is an alkyl group, as for example a $C_1$ to $C_{18}$ alkyl group, preferably a $C_1$ to $C_{16}$, more preferably a $C_1$ to $C_{14}$, very preferably $C_1$ to $C_{12}$, and more particularly $C_1$ to $C_{10}$ alkyl group. For the radical $R^b$, a $C_1$ to $C_6$ alkyl group represents one particular embodiment, and in a very particular embodiment the alkyl group is a $C_1$ to $C_4$ alkyl group.

$R^c$ and $R^d$ are preferably independently of one another a hydrogen atom or an organic radical having 1 to 10 C atoms. The organic radical may also comprise further heteroatoms, more particularly oxygen atoms, nitrogen, sulfur or phosphorus atoms, or functional groups, as for example hydroxyl groups, ether groups, ester groups, or carbonyl groups.

More particularly $R^c$ and $R^d$ are a hydrocarbon radical which apart from carbon and hydrogen may further comprise at most hydroxyl groups, ether groups, ester groups or carbonyl groups.

$R^c$ and $R^d$ with particular preference are independently of one another a hydrocarbon radical having 1 to 20 C atoms, more particularly having 1 to 10 C atoms, which comprises no other heteroatoms, e.g., oxygen or nitrogen. The hydrocarbon radical may be aliphatic (in which case unsaturated aliphatic groups are also included) or aromatic, or may comprise both aromatic and aliphatic groups.

Examples of hydrocarbon radicals include the phenyl group, benzyl group, a benzyl group or phenyl group substituted by one or more $C_1$ to $C_4$ alkyl groups, or the mesityl group, alkyl groups and alkenyl groups, more particularly the alkyl group.

With very particular preference $R^c$ and $R^d$ are a hydrogen atom or a $C_1$ to $C_{10}$ alkyl group. A particularly preferred alkyl group is a $C_1$ to $C_6$ alkyl group, and in one particular embodiment the alkyl group is a $C_1$ to $C_4$ alkyl group.

With very particular preference $R^c$ and $R^d$ are independently of one another a methyl, ethyl, n-propyl, isopropyl, n-butyl, sec-butyl or tert-butyl group, with the methyl, ethyl n-propyl, and n-butyl groups having particular importance.

In one particular embodiment $R^c$ and $R^d$ are each H atoms.

In a very particular embodiment $R^b$, $R^c$, and $R^d$ are each H atoms.

Examples of imidazolium ions are 1-butyl-3-vinyl-imidazol-1-ium, 1-pentyl-3-vinyl-imidazol-1-ium, 1-hexyl-3-vinyl-imidazol-1-ium, 1-octyl-3-vinyl-imidazol-1-ium, 1-decyl-3-vinyl-imidazol-1-ium, 1-dodecyl-3-vinyl-imidazol-1-ium, 1-tetradecyl-3-vinyl-imidazol-1-ium, 1-hexadecyl-3-vinyl-imidazol-1-ium, 1-octadecyl-3-vinyl-imidazol-1-ium, 1-hexyl-2-methyl-3-vinyl-imidazol-1-ium, 1-octyl-2-methyl-3-vinyl-imidazol-1-ium, 1-decyl-2-methyl-3-vinyl-imidazol-1-ium, 1-dodecyl-2-methyl-3-vinyl-imidazol-1-ium, 1-tetradecyl-2-methyl-3-vinyl-imidazol-1-ium, 1-hexadecyl-2-methyl-3-vinyl-imidazol-1-ium, and 1-octadecyl-2-methyl-3-vinyl-imidazol-1-ium.

Preferred imidazolium ions are 1-butyl-3-vinyl-imidazol-1-ium, 1-hexyl-3-vinyl-imidazol-1-ium, 1-octyl-3-vinyl-imidazol-1-ium, 1-decyl-3-vinyl-imidazol-1-ium, 1-dodecyl-3-vinyl-imidazol-1-ium, 1-tetradecyl-3-vinyl-imidazol-1-ium, 1-hexadecyl-3-vinyl-imidazol-1-ium, and 1-octadecyl-3-vinyl-imidazol-1-ium.

The anion $An^-$ is any desired anion, preferably a halide or carboxylate anion, preferably a halide anion.

Anions other than carboxylate anion are described, for example, in WO 2007/090755, particularly from page 20 line 36 to page 24 line 37 therein, which is hereby made part of the present disclosure content by reference.

Suitable anions are more particularly those from the group of the halides and halogen-containing compounds of the following formulae:

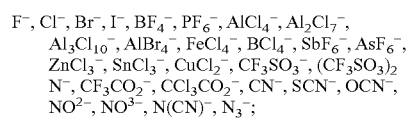

the group of the sulfates, sulfites, and sulfonates, of the following general formulae:

the group of the phosphates, of the following general formulae:

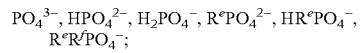

the group of the phosphonates and phosphinates, of the following general formula:

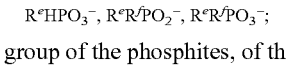

the group of the phosphites, of the following general formulae:

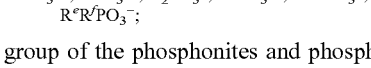

the group of the phosphonites and phosphinites, of the following general formula:

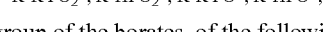

the group of the borates, of the following general formulae:

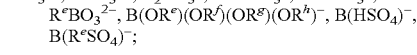

the group of the boronates, of the following general formulae:

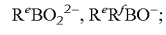

the group of the carbonates and carbonic esters, of the following general formulae:

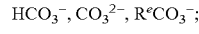

the group of the silicates and silicic acid esters, of the following general formulae:

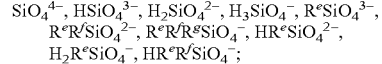

the group of the alkyl silane and aryl silane salts, of the following general formulae:

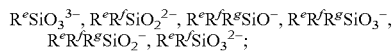

the group of the carboximides, bis(sulfonyl)imides, and sulfonylimides, of the following general formulae:

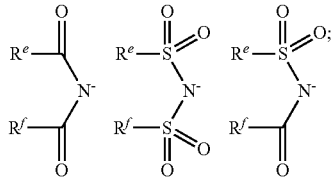

the group of the methides, of the following general formula:

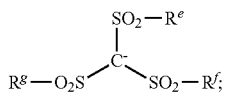

the group of the alkoxides and aryl oxides, of the following general formulae:

the group of the halometallates, of the following general formula:

where M is a metal and Hal is fluorine, chlorine, bromine or iodine, r and t are positive integers, and indicate the stoichiometry of the complex, and s is a positive integer and indicates the charge of the complex;
the group of the sulfides, hydrogen sulfides, polysulfides, hydrogenpolysulfides, and thiolates, of the following general formulae:

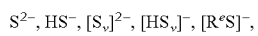

where v is a positive integer from 2 to 10; and
the group of the complex metal ions such as $Fe(CN)_6^{3-}$, $Fe(CN)_6^{4-}$, $MnO_4^-$, $Fe(CO)_4^-$.

In the above anions, $R^e$, $R^f$, $R^g$, and $R^h$ independently of one another are in each case
hydrogen;
$C_1$-$C_{30}$ alkyl and its aryl-, heteroaryl-, cycloalkyl-, halogen-, hydroxyl-, amino-, carboxyl-, formyl-, —O—, —CO—, —CO—O— or —CO—N< substituted components, such as, for example, methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, triacontyl, phenylmethyl (benzyl), diphenylmethyl, triphenylmethyl, 2-phenylethyl, 3-phenylpropyl, cyclopentylmethyl, 2-cyclopentylethyl, 3-cyclopentylpropyl, cyclohexylmethyl, 2-cyclohexylethyl, 3-cyclohexylpropyl, methoxy, ethoxy, formyl, acetyl or $C_qF_{2(q-a)+(1-b)}H_{2a-b}$ with $q \leq 30$, $0 \leq a \leq q$ and b=0 or 1 (for example, $CF_3$, $C_2F_5$, $CH_2CH_2$—$C_{(q-2)}F_{2(q-2)+1}$, $C_6F_{13}$, $C_8F_{11}$, $C_{10}F_{21}$, $C_{12}F_{25}$);
$C_3$-$C_{12}$ cycloalkyl and its aryl-, heteroaryl-, cycloalkyl-, halogen-, hydroxyl-, amino-, carboxyl-, formyl-, —O—, —CO— or —CO—O-substituted components, such as, for example, cyclopentyl, 2-methyl-1-cyclopentyl, 3-methyl-1-cyclopentyl, cyclohexyl, 2-methyl-1-cyclohexyl, 3-methyl-1-cyclohexyl, 4-methyl-1-cyclohexyl or $C_qF_{2(q-a)-(1-b)}H_{2a-b}$ with $q \leq 30$, $0 \leq a \leq q$ and b=0 or 1;
$C_2$-$C_{30}$ alkenyl and its aryl-, heteroaryl-, cycloalkyl-, halogen-, hydroxyl-, amino-, carboxyl-, formyl-, —O—, —CO— or —CO—O-substituted components, such as, for example, 2-propenyl, 3-butenyl, cis-2-butenyl, trans-2-butenyl or $C_qF_{2(q-a)-(1-b)}H_{2a-b}$ with $q \leq 30$, $0 \leq a \leq q$ and b=0 or 1;
$C_3$-$C_{12}$ cycloalkenyl and its aryl-, heteroaryl-, cycloalkyl-, halogen-, hydroxyl-, amino-, carboxyl-, formyl-, —O—, —CO— or —CO—O-substituted components, such as, for example 3-cyclopentenyl, 2-cyclohexenyl, 3-cyclohexenyl, 2,5-cyclohexadienyl or $C_qF_{2(q-a)-3(1-b)}H_{2a-3b}$ with $q \leq 30$, $0 \leq a \leq q$ and b=0 or 1;
aryl or heteroaryl having 2 to 30 carbon atoms, and their alkyl-, aryl-, heteroaryl-, cycloalkyl-, halogen-, hydroxy-, amino-, carboxy-, formyl-, —O—, —CO— oder-CO—O-substituted components, such as, for example, phenyl, 2-methylphenyl (2-tolyl), 3-methylphenyl (3-tolyl), 4-methylphenyl, 2-ethylphenyl, 3-ethylphenyl, 4-ethylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 4-phenylphenyl, 1-naphthyl, 2-naphthyl, 1-pyrrolyl, 2-pyrrolyl, 3-pyrrolyl, 2-pyridinyl, 3-pyridinyl, 4-pyridinyl or $C_6F_{(5-a)}H_a$ with $0 \leq a \leq 5$; or
two radicals denote an unsaturated, saturated or aromatic ring which is unsubstituted or substituted by functional groups, aryl, alkyl, aryloxy, alkyloxy, halogen, heteroatoms and/or heterocycles, and which is uninterrupted or interrupted by one or more oxygen and/or sulfur atoms and/or by one or more substituted or unsubstituted imino groups.

In the above anions, $R^e$, $R^f$, $R^g$, and $R^h$ are preferably each independently of one another a hydrogen atom or a $C_1$ to $C_{12}$ alkyl group or a $CF_3$.

Examples of anions include chloride; bromide; iodide; thiocyanate; isothiocyanate; azide, hexafluorophosphate; trifluoromethanesulfonate; methanesulfonate; the carboxylates, especially formate; acetate; mandelate; carbonates, preferably methyl carbonate and n-butyl carbonate, nitrate; nitrite; trifluoroacetate; sulfate; hydrogensulfate; methylsulfate; ethylsulfate; 1-propylsulfate; 1-butylsulfate; 1-hexylsulfate; 1-octylsulfate; phosphate; dihydrogenphosphate; hydrogenphosphate; $C_1$-$C_4$ dialkylphosphates; propionate; tetrachloroaluminate; $Al_2Cl_7$—; chlorozincate; chloroferrate; bis(trifluoromethylsulfonyl)imide; bis(pentafluoroethylsulfonyl)imide; bis(methylsulfonyl)imide; bis(p-tolylsulfonyl)imide; tris(trifluoromethylsulfonyl)methide; bis(pentafluoroethylsulfonyl)methide; p-tolylsulfonate; tetracarbonylcobaltate; dimethylene glycol monomethyl ether sulfate; oleate; stearate; acrylate; methacrylate; maleate; hydrogencitrate; vinylphosphonate; bis(pentafluoroethyl)phosphinate; borates such as bis[salicylato(2-)]borate, bis[oxalato(2-)]borate, bis[1,2-benzenediolato(2-)—O,O']borate, tetracyanoborate, tetrafluoroborate; dicyanamide; tris(pentafluoroethyl)trifluorophosphate; tris(heptafluoropropyl)trifluorophosphate, cyclic arylphosphates such as pyrrocatechol-phosphate $(C_6H_4O_2)P(O)O$—, and chlorocobaltate.

Particularly preferred anions are those from the group of the halides, especially chloride, bromide, iodide, azide, thiocyanate, acetate, methyl carbonate, tetrafluoroborate, trifluoromethanesulfonate, methanesulfonate, bis(trifluoromethylsulfonyl)imide, ethylsulfate and diethyl phosphate.

The optional at least one urethane (meth)acrylate (A) comprises urethane (meth)acrylates of the kind comprising
at least one (meth)acrylate group and
optionally at least one quaternary ammonium group, substituted by four radicals which have in total at least 12 carbon atoms.

The urethane (meth)acrylates (A) have preferably one to six, more preferably one to four, very preferably one to three, more particularly one to two, and especially just one (meth)acrylate group.

A (meth)acrylate group in the context of this specification is a methacrylate or acrylate group, preferably an acrylate group.

The urethane (meth)acrylates (A) have preferably one to four, more preferably one to three, very preferably one to two, and more particularly just one quaternary ammonium group.

"Quaternary ammonium groups" in the sense of the present specification are those which are substituted by three hydrocarbon radicals and are bonded by a spacer to the urethane (meth)acrylate. The number of carbon atoms in these quaternary ammonium groups is determined from the sum of the carbon atoms in the three hydrocarbon radicals and also of the carbon atoms in the spacer, account being taken here only of the carbon atoms between the nitrogen atom of the quaternary ammonium group and the first heteroatom.

The spacer comprises at least one carbon atom, preferably at least two carbon atoms.

Generally speaking, the spacer is not longer than ten carbon atoms, preferably not longer than six carbon atoms, and very preferably not longer than four carbon atoms.

Where the quaternary ammonium group comprises a ring, for example, the carbon atoms of the ring are of course included only once in the calculation.

According to this definition, a 2-(N,N,N-triethylammonium)ethyl group has eight carbon atoms and a 3-(N-ethylpiperidinium)propyl group has ten carbon atoms.

In one preferred embodiment, the quaternary ammonium group has the following formula (I)

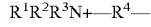
$R^1R^2R^3N^+\!\!-\!\!R^4\!\!-$ in which
$R^1$, $R^2$, and $R^3$ each independently of one another are alkyl groups having 1 to 20, preferably one to 15 carbon atoms, aryl groups having 6 to 14, preferably 6 to 10, more preferably 6 carbon atoms, or aralkyl groups having 7 to 20, preferably 7 to 15, more preferably 7 to 10 carbon atoms, it also being possible for two of the radicals $R^1$ to $R^3$ together to be part of a ring, and $R^4$ is a divalent hydrocarbon radical having 1 to 10, preferably 2 to 6, more preferably 2 to 4 carbon atoms.

Examples of alkyl groups having 1 to 20 carbon atoms are methyl, ethyl, isopropyl, n-propyl, n-butyl, isobutyl, sec-butyl, tert-butyl, n-hexyl, n-heptyl, 2-ethylhexyl, n-octyl, n-decyl, 2-propylheptyl, n-dodecyl, isotridecyl, n-tetradecyl, n-hexadecyl, n-octadecyl, and n-eicosyl.

Examples of aryl groups having 6 to 14 carbon atoms are phenyl, α-naphthyl, and β-naphthyl.

Examples of aralkyl groups having 7 to 20 carbon atoms are benzyl, phenethyl, 3-phenylpropyl, 4-phenylbutyl, and 6-phenylhexyl.

Examples of divalent hydrocarbon radicals having 1 to 10 carbon atoms are 1,2-ethylene, 1,2-propylene, 1,3-propylene, 1,2-butylene, 1,3-butylene, 1,4-butylene, 1,6-hexylene, 2-methyl-1,3-propylene, 2-ethyl-1,3-propylene, 2,2-dimethyl-1,3-propylene, 1,8-octylene, and 1,10-decylene.

Preferably the radicals $R^1$ to $R^3$ independently of one another are each alkyl groups.

In one preferred embodiment of the present invention, the groups $R^1$ to $R^4$ in the quaternary ammonium groups of the formula (I) have in total at least 12 carbon atoms, preferably at least 14, more preferably at least 16, and very preferably at least 18 carbon atoms.

In another preferred embodiment at least one, preferably just one, of the radicals $R^1$ to $R^3$ has at least 10 and preferably at least 12 carbon atoms.

In another preferred embodiment, one of the radicals $R^1$ to $R^3$ has at least 10 and preferably at least 12 carbon atoms, and the two others each have not more than 4, preferably not more than 2, carbon atoms.

The compounds (A) are preferably urethane (meth)acrylates composed of
(a1) at least one diisocyanate or polyisocyanate,
(a2) at least one compound having at least one, preferably just one, group that is reactive toward isocyanate groups, and at least one (meth)acrylate group,
(a3) optionally at least one low molecular mass compound having at least two groups that are reactive toward isocyanate groups,
(a4) optionally at least one high molecular mass compound having at least two groups that are reactive toward isocyanate groups,
(a5) optionally at least one compound having at least one, preferably just one, group that is reactive toward isocyanate groups, and at least one quaternary ammonium group, and
(a6) optionally at least one compound having just one group that is reactive toward isocyanate groups.

Isocyanate-reactive groups here are preferably hydroxyl, mercapto, or a primary or secondary amino groups, more preferably hydroxyl or primary amino groups, and very preferably hydroxyl groups.

The compounds (A) preferably have a (meth)acrylate group density of at least 0.5 mol per 1000 g, more preferably of 1 to 5, and very preferably of 2 to 4 mol per 1000.

The compounds (A) preferably have an ammonium group density of at least 0.07 mol per 1000 g, more preferably of 0.14 to 1, and very preferably of 0.14 to 0.5 mol per 1000.

The urethane (meth)acrylates (A) preferably have a number-average molar weight $M_n$ of less than 5000, in particular below 2000, and particularly preferably below 1000 g/mol (determined by gel permeation chromatography using tetrahydrofuran and polystyrene as standard).

Components (a1)

Particularly suitable polyisocyanates as components (a1) for the polyurethanes are (cyclo)aliphatic diisocyanates and polyisocyanates based on (cyclo)aliphatic diisocyanates.

The term (cyclo)aliphatic is an abbreviation in this specification for cycloaliphatic or aliphatic.

Cycloaliphatic isocyanates are those which comprise at least one cycloaliphatic ring system.

Aliphatic isocyanates are those which comprise exclusively linear or branched chains, i.e., acyclic compounds.

The polyisocyanates which can be used in accordance with the invention do not have any aromatic groups.

The component (a1) is at least one di- or polyisocyanate, for example one to four, preferably one to three, more preferably one to two, and very preferably just one.

The monomeric isocyanates are preferably diisocyanates which carry just two isocyanate groups. It would also be possible in principle, however, for them to be monoisocyanates with one isocyanate group; such compounds, however, are less preferred.

Also suitable in principle are higher isocyanates containing on average more than 2 isocyanate groups; these, however, are less preferred. Suitability therefor is possessed, for example, by triisocyanates such as triisocyanatononane or 2'-isocyanatoethyl 2,6-diisocyanatohexanoate, or the mixtures of di-, tri- and higher polyisocyanates.

The monomeric isocyanates comprise substantially no reaction products of the isocyanate groups with themselves.

The monomeric isocyanates are preferably isocyanates having 4 to 20 C atoms. Examples of typical aliphatic diisocyanates are tetramethylene diisocyanate, 1,5-pentamethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, (e.g., methyl or ethyl 2,6-diisocyanatohexanoate), trimethylhexane diisocyanate or tetramethylhexane diisocyanate. Examples of cycloaliphatic diisocyanates are 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4-, or 2,6-diisocyanato-1-methylcyclohexane, and also 3 (or 4), 8 (or 9)-bis(isocyanatomethyl)-tricyclo[5.2.1.0$^{2,6}$]decane isomer mixtures.

Particularly preferred diisocyanates are 1,6-hexamethylene diisocyanate, 1,3-bis(isocyanatomethyl)cyclohexane, and isophorone diisocyanate; very particular preference is given to isophorone diisocyanate and 1,6-hexamethylene diisocyanate, with more particular preference being given to isophorone diisocyanate.

It is also possible for mixtures of the stated isocyanates to be present.

Isophorone diisocyanate usually takes the form of a mixture, more particularly a mixture of the cis and trans isomers, generally in a ratio of around 60:40 to 80:20 (w/w), preferably in a ratio of around 70:30 to 75:25, more preferably in a ratio of around 75:25.

The amount of isomeric compounds in the diisocyanate is not critical to the process of the invention. Thus 1,6-hexamethylene diisocyanate may comprise, for example, a small fraction of 2-urethane (meth)acrylates and/or 3-methyl-1,5-pentamethylene diisocyanate.

It is possible to use polyisocyanates not only based on those diisocyanates obtained by phosgenating the corresponding amines, but also those prepared without the use of phosgene, i.e., by phosgene-free processes. According to EP-A-0 126 299 (U.S. Pat. No. 4,596,678), EP-A-126 300 (U.S. Pat. No. 4,596,679), and EP-A-355 443 (U.S. Pat. No. 5,087,739), for example, (cyclo)aliphatic diisocyanates, such as 1,6-hexamethylene diisocyanate (HDI), can be prepared by reacting the (cyclo)aliphatic diamines with, for example, urea and alcohols to form (cyclo)aliphatic biscarbamic esters, and cleaving them thermally to give the corresponding diisocyanates and alcohols. The synthesis takes place, usually, continuously in a circulation process, and in the presence or absence of N-unsubstituted carbamic esters, dialkyl carbonates, and other byproducts recycled from the reaction process. Diisocyanates obtained in this way generally have a very low, or even unmeasurable, fraction of chlorinated compounds, which can lead to advantageous color numbers in the products. It is a further advantage that the process is based on aliphatic diisocyanates and is independent of their preparation, i.e., independent of whether the preparation is via a phosgenation or via a phosgene-free process.

In one embodiment the diisocyanate has a total hydrolyzable chlorine content of less than 200 ppm, preferably of less than 120 ppm, more preferably less than 80 ppm, very preferably less than 50 ppm, more particularly less than 15 ppm, and especially less than 10 ppm. This may be measured, for example, by the ASTM specification D4663-98. It is also, however, possible of course to use diisocyanates having a higher chlorine content, of up to 500 ppm, for example.

It will be appreciated that it is also possible to use mixtures of diisocyanate obtained by reacting the corresponding diamine with, for example, urea and alcohols, and cleaving the resultant biscarbamic esters, with diisocyanate obtained by phosgenating the corresponding amine.

The polyisocyanates based on these diisocyanates are preferably the following compounds:

1) Polyisocyanates containing isocyanurate groups and derived from aliphatic and/or cycloaliphatic diisocyanates. Particularly preferred here are the corresponding aliphatic and/or cycloaliphatic isocyanato-isocyanurates, and more particularly those based on hexamethylene diisocyanate and/or isophorone diisocyanate. The isocyanurates present in this case are more particularly tris-isocyanatoalkyl and/or tris-isocyanatocycloalkyl isocyanurates, which represent cyclic trimers of the diisocyanates, or are mixtures with their higher homologs containing more than one isocyanurate ring. The isocyanato-isocyanurates generally have an NCO content of 10% to 30% by weight, more particularly 15% to 25% by weight, and an average NCO functionality of 2.6 to 8.

2) Polyisocyanates containing uretdione groups and having aliphatically and/or cycloaliphatically attached isocyanate groups, preferably aliphatically and/or cycloaliphatically attached groups, and more particularly those derived from hexamethylene diisocyanate or isophorone diisocyanate. Uretdione diisocyanates are cyclic dimerization products of diisocyanates.

In the context of this invention, the polyisocyanates containing uretdione groups are obtained in a mixture with other polyisocyanates, more particularly those specified under 1). For that purpose, the diisocyanates may be reacted under conditions in which not only uretdione groups but also the other polyisocyanates are formed, or first of all the uretdione groups are formed and then are reacted to give the other polyisocyanates, or the diisocyanates are first reacted to give the other polyisocyanates, which are then reacted to form products containing uretdione groups.

3) Polyisocyanates containing urethane and/or allophanate groups and having aliphatically or cycloaliphatically attached isocyanate groups, as are obtained, for example, by reacting excess amounts of diisocyanate, such as hexamethylene diisocyanate or isophorone diisocyanate, for example, with monohydric or polyhydric alcohols. These polyisocyanates containing urethane and/or allophanate groups generally have an NCO content of 12% to 24% by weight and an average NCO functionality of 2.1 to 4.5. Polyisocyanates of this kind containing urethane and/or allophanate groups may be prepared without catalysis or, preferably, in the presence of catalysts, such as, for example, ammonium carboxylates or ammonium hydroxides, or allophanatization catalysts, e.g., Zn(II) compounds, in each case in the presence of monohydric, dihydric or polyhydric, preferably monohydric, alcohols. The polyisocyanates containing urethane and/or allophanate groups may also be prepared in a mixture with other polyisocyanates, more particularly those specified under 1).
4) Uretonimine-modified polyisocyanates.
5) Carbodiimide-modified polyisocyanates.
6) Hyperbranched polyisocyanates, of the kind known, for example, from DE-A1 10013186 or DE-A1 10013187.
7) Polyurethane-polyisocyanate prepolymers, from di- and/or polyisocyanates with alcohols.
8) Polyurea-polyisocyanate prepolymers.
9) Hydrophilically modified polyisocyanates, i.e., polyisocyanates which in addition to the groups described under 1-10 comprise those groups which are formed formally by addition of molecules with NCO-reactive groups and hydrophilicizing groups onto the isocyanate groups of above molecules. The latter groups are nonionic groups such as alkylpolyethylene oxide and/or ionic groups, derived, for example, from phosphoric acid, phosphonic acid, sulfuric acid or sulfonic acid, and/or their salts.
10) Polyisocyanates comprising iminooxadiazinedione groups, derived preferably from hexamethylene diisocyanate or isophorone diisocyanate. Polyisocyanates of this kind comprising iminooxadiazinedione groups are preparable from diisocyanates by means of specific catalysts.

In preferred compounds (a1) the polyisocyanate comprises at least one moiety selected from the group consisting of isocyanurates, biurets, and allophanates, preferably from the group consisting of isocyanurates and allophanates, as described in WO 00/39183, which is hereby considered by reference to be part of the present disclosure; with particular preference the compound in question is a polyisocyanate containing isocyanurate groups.

In one particularly preferred embodiment the polyisocyanate (a1) is a polyisocyanate based on 1,6-hexamethylene diisocyanate and/or isophorone diisocyanate, very preferably based on isophorone diisocyanate.

More particularly the compound (a1) is a polyisocyanate which comprises isocyanurate groups and is based on isophorone diisocyanate.

Components (a2)

Components (a2) each comprise, at least one, one to three, for example, preferably one to two, and very preferably just one compound having at least one, preferably just one, group that is reactive toward isocyanate groups, and at least one (meth)acrylate group.

Preferred compounds of components (a2) are, for example, the esters of dihydric or polyhydric alcohols with acrylic acid or methacrylic acid, more preferably acrylic acid.

Suitable alcohols are, for example, diols such as ethylene glycol, 1,2-propanediol, 1,3-propanediol, 1,1-dimethylethane-1,2-diol, 2-butyl-2-ethyl-1,3-propanediol, 2-ethyl-1,3-propanediol, 2-me-thyl-1,3-propanediol, neopentylglycol, neopentylglycol hydroxypivalate, 1,2-, 1,3- or 1,4-butanediol, 1,6-hexanediol, 1,10-decanediol, bis-(4-hydroxycyclohexane)isopropylidene, tetramethylcyclobutanediol, 1,2-, 1,3- or 1,4-cyclohexanediol, cyclooctanediol, norbornanediol, pinanediol, decalindiol, 2-ethyl-1,3-hexanediol, 2,4-diethyloctane-1,3-diol, hydroquinone, bisphenol A, bisphenol F, bisphenol B, bisphenol S, 2,2-bis(4-hydroxycyclohexyl)propane, 1,1-, 1,2-, 1,3-, and 1,4-cyclohexanedimethanol, 1,2-, 1,3- or 1,4-cyclohexanediol, and tricyclodecanedimethanol.

Suitable triols and polyols have, for example, 3 to 25, preferably 3 to 18, carbon atoms. They include, for example trimethylolbutane, trimethylolpropane, trimethylolethane, pentaerythritol, glycerol, ditrimethylolpropane, dipentaerythritol, ditrimethylolpropane, sorbitol, mannitol, diglycerol, threitol, erythritol, adonitol (ribitol), arabitol (lyxitol), xylitol, dulcitol (galactitol), maltitol or isomalt.

Preferably the compounds of components (a2) are selected from 2-hydroxyethyl acrylate, 2-hydroxyethyl methacrylate, 2-hydroxypropyl acrylate, 2-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, trimethylolpropane mono- or -diacrylate, pentaerythritol diacrylate or triacrylate, dipentaerythritol pentaacrylate, and mixtures thereof.

Preferred in particular as compounds (a2) are 2-hydroxyethyl acrylate, 2-hydroxyethyl methacrylate, 2-hydroxypropyl acrylate, 2-hydroxypropyl methacrylate, pentaerythritol triacrylate, and dipentaerythritol pentaacrylate.

Components a3)

The optional components a3) comprise at least one compound having at least two, for example two to six, preferably two to four, more preferably two to three, and very preferably just two groups that are reactive toward isocyanate groups, selected from hydroxyl, mercapto, primary and/or secondary amino groups, preferably hydroxyl and primary amino groups, more preferably hydroxyl groups.

Low molecular weight alcohols a3) have a molecular weight of not more than 500 g/mol. Particularly preferred are alcohols having 2 to 20 carbon atoms and, for example, 2 to 6 hydroxyl groups, preferably 2 to 4, more preferably 2 to 3, and very preferably just 2 hydroxyl groups. Preference is given in particular to hydrolysis-stable short-chain diols having 4 to 20, preferably 6 to 12, carbon atoms. These include preferably 1,1-, 1,2-, 1,3- or 1,4-di(hydroxymethyl)cyclohexane, 2,2-bis(4'-hydroxycyclohexyl)propane, 1,2-, 1,3- or 1,4-cyclohexanediol, tetramethylcyclobutanediol, cyclooctanediol or norbornanediol. Particular preference is given to using aliphatic hydrocarbon-diols, such as the isomeric butanediols, pentanediols, hexanediols, heptanediols, octanediols, nonanediols, decanediols, undecanediols and dodecanediols. Particular preference is given to 1,2-, 1,3- or 1,4-butanediol, 1,4-pentanediol, 1,5-pentanediol, 1,6-hexanediol, 2,5-hexanediol, di(hydroxymethyl)cyclohexane isomers and 2,2-bis (4'-hydroxycyclohexyl)propane. With very particular preference the diols (a3) are cycloaliphatic diols, more particularly 1,1-, 1,2-, 1,3- or 1,4-di(hydroxymethyl)cyclohexane, 2,2-bis (4'-hydroxycyclohexyl)propane, 1,2-, 1,3- or 1,4-cyclohexanediol.

Components a4)

Suitable compounds a4) are also polymeric polyols. The number-average molecular weight $M_n$ of these polymers is preferably in a range from more than 500 to 100 000, more preferably 500 to 10 000. The OH numbers are situated preferably in a range from about 20 to 300 mg KOH/g polymer.

The functionality of the polyols a4) is at least two, two to six for example, preferably two to four, more preferably two to three, and very preferably just two.

Preferred compounds a4) are polyesterols, polyetherols, and polycarbonate polyols, more preferably polyesterols and polyetherols, and very preferably polyesterols.

Preferred polyesterols are those based on aliphatic, cycloaliphatic and/or aromatic dicarboxylic, tricarboxylic and polycarboxylic acids with diols, triols and/or polyols, and also lactone-based polyesterols.

Polyesterpolyols, are known, for example, from Ullmanns Encyklopädie der technischen Chemie, 4th edition, volume 19, pp. 62 to 65. Preference is given to using polyesterpolyols obtained by reaction of dihydric alcohols with dibasic carboxylic acids. Instead of the free polycarboxylic acids it is also possible to use the corresponding polycarboxylic anhydrides or corresponding polycarboxylic esters of lower alcohols or mixtures thereof to prepare the polyesterpolyols. The polycarboxylic acids may be aliphatic, cycloaliphatic, araliphatic, aromatic or heterocyclic, and if desired may be substituted, by halogen atoms, for example, and/or unsaturated. Examples thereof that may be mentioned include the following:

oxalic acid, maleic acid, fumaric acid, succinic acid, glutaric acid, adipic acid, sebacic acid, dodecanedioic acid, o-phthalic acid, isophthalic acid, terephthalic acid, trimellitic acid, azelaic acid, 1,4-cyclohexanedicarboxylic acid or tetrahydrophthalic acid, suberic acid, azelaic acid, phthalic anhydride, tetrahydrophthalic anhydride, hexahydrophthalic anhydride, tetrachlorophthalic anhydride, endomethylenetetrahydrophthalic anhydride, glutaric anhydride, maleic anhydride, dimeric fatty acids, their isomers and hydrogenation products, and their esterifiable derivatives, such as anhydrides or dialkyl esters, for example, $C_1$-$C_4$ alkyl esters, preferably methyl, ethyl or n-butyl esters, of the stated acids are employed. Dicarboxylic acids of general formula HOOC—$(CH_2)_y$—COOH are preferred, where y is a number from 1 to 20, preferably an even number from 2 to 20; particular preference is given to succinic acid, adipic acid, sebacic acid, and dodecanedicarboxylic acid.

Suitable polyhydric alcohols for preparing the polyesterols include 1,2-propanediol, ethylene glycol, 2,2-dimethyl-1,2-ethanediol, 1,3-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, poly-THF with a molar mass between 162 and 2000, poly-1,3-propanediol with a molar mass between 134 and 2000, poly-1,2-propanediol with a molar mass between 134 and 2000, polyethylene glycol with a molar mass between 106 and 2000, neopentylglycol, neopentylglycol hydroxypivalate, 2-ethyl-1,3-propanediol, 2-methyl-1,3-propanediol, 2,2-bis(4-hydroxycyclohexyl)propane, 1,1-, 1,2-, 1,3-, and 1,4-cyclohexanedimethanol, 1,2-, 1,3- or 1,4-cyclohexanediol, trimethylolbutane, trimethylolpropane, trimethylolethane, neopentylglycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol or isomalt, which if desired may be alkoxylated as described above.

Preference is given to alcohols of the general formula HO—$(CH_2)_x$—OH, where x is a number from 1 to 20, preferably an even number from 2 to 20. Preferred are ethylene glycol, butane-1,4-diol, hexane-1,6-diol, octane-1,8-diol, and dodecane-1,12-diol. Additionally preferred is neopentylglycol.

Also suitable, furthermore, are polycarbonate-diols, of the kind obtainable, for example, by reacting phosgene with an excess of the low molecular weight alcohols stated as synthesis components for the polyesterpolyols.

Lactone-based polyesterdiols are also suitable, these being homopolymers or copolymers of lactones, preferably hydroxyl-terminated adducts of lactones with suitable difunctional starter molecules. Suitable lactones are preferably those deriving from compounds of the general formula HO—$(CH_2)_z$—COOH, where z is a number from 1 to 20, and where one H atom of a methylene unit may also have been substituted by a $C_1$ to $C_4$ alkyl radical. Examples are ε-caprolactone, β-propiolactone, gamma-butyrolactone and/or methyl-ε-caprolactone, 4-hydroxybenzoic acid, 6-hydroxy-2-naphthoic acid or pivalolactone, and mixtures thereof. Examples of suitable starter components are the low molecular mass dihydric alcohols specified above as a synthesis component for the polyesterpolyols. The corresponding polymers of ε-caprolactone are particularly preferred. Lower polyesterdiols or polyetherdiols may also be used as starters for preparing the lactone polymers. Instead of the polymers of lactones it is also possible to use the corresponding, chemically equivalent polycondensates of the hydroxycarboxylic acids corresponding to the lactones.

In the case of the lactone-based polyesterol, preference is given to a polycaprolactone diol, which, formally, is an adduct of caprolactone with a diol HO—R—OH, having the formula

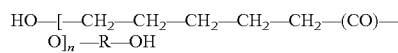

or

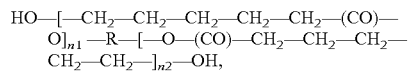

in which n, n1, and n2 are positive integers, for which n=1 to 5 and (n1+n2)=1 to 5, and R is a divalent aliphatic or cycloaliphatic radical having at least one carbon atom, preferably 2 to 20, more preferably 2 to 10, very preferably 3 to 6 carbon atoms.

Aliphatic radicals R are, for example, linear or branched alkylene, e.g., methylene, 1,2-ethylene, 1,2- or 1,3-propylene, 1,2-, 1,3- or 1,4-butylene, 1,1-dimethyl-1,2-ethylene or 1,2-dimethyl-1,2-ethylene, 1,5-pentylene, 1,6-hexylene, 1,8-octylene, 1,10-decylene, or 1,12-dodecylene. Preference is given to 1,2-ethylene, 1,2- or 1,3-propylene, 1,4-butylene and 1,5-pentylene, particular preference to 1,4-butylene and 1,6-hexylene.

Conceivable, albeit less preferably, are cycloaliphatic radicals, examples being cyclopropylene, cyclopentylene, cyclohexylene, cyclooctylene, and cyclododecylene.

Preferred polyesterols as compounds (a4) have a functionality in terms of free hydroxyl groups of at least 2, more preferably of 2 to 6, very preferably of 2 to 4, more particularly of 2 to 3, and especially of 2 exactly.

The molecular weights $M_n$ of the polyesterols lie preferably between 500 and 4000 ($M_n$ determined by gel permeation chromatography with polystyrene as standard and tetrahydrofuran as eluent).

Optional Components (a5)

The at least one, one to four for example, preferably one to three, more preferably one to two, and preferably just one optional compound (a5) has at least one, one to three for example, and preferably one to two groups that are reactive toward isocyanate groups, and at least one, one to four for example, preferably one to three, more preferably one to two, and very preferably just one quaternary ammonium group.

Particularly preferred compounds (a5) are those of the formula (II)

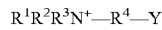

in which $R^1$ to $R^4$ have the definitions stated above and

Y represents an isocyanate-reactive group, preferably an —OH or —$NH_2$ group.

Preferred compounds (a5) having an isocyanate-reactive group are 2-[N,N-bis(tridecyl)-N-methylammonium)]ethanol, 2-[N,N-bis(hexyl)-N-methylammonium)]ethanol, 2-[N,N-bis(tridecyl)-N-methylammonium)]propan-1-ol, 2-[N,N-bis(hexyl)-N-methylammonium)]-propan-1-ol, N-alkylated N,N-dimethylethanolamines, and N-alkylated N,N-dimethylpropanolamines, in which the alkyl radical preferably comprises at least 6, more preferably at least 8, and very preferably at least 12 carbon atoms. Preference extends to the products of such compounds that are further reacted one to fifty times, preferably two to thirty times, and more preferably four to twenty times with ethylene oxide and/or propylene oxide, preferably only with ethylene oxide.

Preferred compounds (a5) having two isocyanate-reactive groups are bis(2-hydroxyethyl)alkylmethylammonium salts, bis(2-hydroxypropyl)alkylmethylammonium salts, bis(2-hydroxyethyl)alkylbenzylammonium salts, and bis(2-hydroxypropyl)alkylbenzylammonium salts, in which the alkyl radical comprises preferably at least 6, more preferably at least 8, and very preferably at least 12 carbon atoms. Preference extends to the products of such compounds that are further reacted one to fifty times, preferably two to thirty times, and more preferably four to twenty times with ethylene oxide and/or propylene oxide, preferably only with ethylene oxide.

Possible counterions of the ammonium salts are halides, as for example chloride, bromide or iodide, sulfate, hydrogensulfate, methylsulfate, ethylsulfate, sulfonate, hydrogensulfonate, methylsulfonate, tosylate, mesylate, phosphate, hydrogenphosphate, dihydrogenphosphate, carbonate, hydrogencarbonate, methylcarbonate, ethylcarbonate, and butylcarbonate.

One possible embodiment involves attaching the ammonium compound to the polyurethane not via a compound of the formula (II) but instead via a compound (a5a) which has at least one, one to three for example, preferably one to two, and very preferably just one group that is reactive toward isocyanate groups, and a first reactive group, with the attachment of the ammonium group taking place by further reaction with a compound (a5b) which has a further reactive group, complementary to the first reactive group, and at least one, one to four for example, preferably one to three, more preferably one to two, and very preferably just one quaternary ammonium group.

Examples of such first reactive groups and further reactive groups complementary thereto are as follows:

| First reactive group | Further reactive group complementary thereto |
|---|---|
| —COOH | Epoxy group |
| —NH$_2$ | Epoxy group |
| Alkoxysilyl | Alkoxysilyl |
| —OH | —NCO |
| —NCO | —OH |

Among these combinations it is preferred if both the compound (a5a) and the compound (a5b) carry identical or different alkoxysilyl groups.

It is generally sufficient here if one silyl group is substituted by at least one alkoxy radical, one to three for example, preferably two or three, and very preferably by three.

The groups in question are preferably tris(alkyloxy)silyl groups or alkylbis(alkyloxy)silyl groups, more preferably tris($C_1$-$C_4$-alkyloxy)silyl groups or $C_1$-$C_4$-alkylbis($C_1$-$C_4$-alkyloxy)silyl groups.

More preferably the groups in question are diethoxymethylsilyl, dimethoxymethylsilyl, methoxydimethylsilyl, ethoxydimethylsilyl, phenoxydimethylsilyl, triethoxysilyl or trimethoxysilyl groups.

With very particular preference the compound (a5a) conforms to the formula (III)

$$(R^5O)_3Si—R^6—Y,$$

in which
Y has the above definition,
$R^5$ is $C_1$-$C_6$ alkyl, preferably $C_1$-$C_4$ alkyl, more preferably methyl, ethyl, n-propyl, tert-butyl, and n-butyl, very preferably methyl, ethyl, and n-butyl, and more particularly methyl, and
$R^6$ is a divalent hydrocarbon radical having 1 to 10, preferably 2 to 6, more preferably 2 to 4 carbon atoms.

Preferred compounds (a5a) are 3-aminopropylsiloxanes and 2-aminoethylsiloxanes, with 3-aminopropyltriethoxysilane being particularly preferred.

Reaction in that case takes place preferably with compounds (a5b) of the formula (IV)

$$R^1R^2R^3N^+—R^4—Si(OR^7)_3$$

in which
$R^1$ to $R^4$ have the above definitions and
$R^7$ is $C_1$-$C_6$ alkyl, preferably $C_1$-$C_4$ alkyl, more preferably methyl, ethyl, n-propyl, tert-butyl, and n-butyl, very preferably methyl, ethyl, and n-butyl, and more particularly methyl.

Preferred compounds (a5b) are 3-ammoniumpropylsiloxanes and 2-ammoniumethylsiloxanes, with the ammonium groups being in each case as defined above.

It is possible to prepare the optional urethane (meth)acrylates in such a way that first of all the compound (a5a) is installed and the resulting compound is only then reacted with the compound (a5b); alternatively, preparation may take place by simultaneous installation of the compounds (a5a) and (a5b) into the urethane (meth)acrylates. The latter, however, is less preferred.

The construction of the urethane (meth)acrylate with compounds (a5) is, however, preferred over the construction with the compounds (a5a) and (a5b).

Components (a6)

In the urethane (meth)acrylates it is possible as optional components (a6) to use at least one further compound having just one group that is reactive toward isocyanate groups. This group may be a hydroxyl, mercapto or a primary or secondary amino group. Suitable compounds (a6) are the customary compounds known to the skilled person, which are used typically in polyurethane production as "stoppers" for lowering the number of reactive free isocyanate groups and/or for modifying the polyurethane properties. They include, for example, monofunctional alcohols, such as methanol, ethanol, n-propanol, isopropanol, n-butanol, etc. Suitable components (a6) are also amines having a primary or secondary amino group, such as methylamine, ethylamine, n-propylamine, diisopropylamine, dimethylamine, diethylamine, di-n-propylamine, diisopropylamine, etc.

The urethane (meth)acrylates (A) generally have the following composition per 100 mol % of reactive isocyanate groups in (a1) (in total):

(a2) 30 to 95 mol %, preferably 40 to 92 mol %, more preferably 50 to 90 mol %, very preferably 60 to 80 mol %, and more particularly 70 to 80 mol %, (a3) 0 to 30 mol %, preferably 0 to 25 mol %, more preferably 0 to 20 mol %, very preferably 0 to 15 mol %, more particularly 0 to 10 mol % and especially 0%, (a4) 0 to 10 mol %, preferably 0 to 8 mol %, more preferably 0 to 5 mol %, very preferably 0 to 3 mol %, and more particularly 0 mol %, (a5) 5 up to 30 mol %, preferably 8 to 25 mol %, more preferably 10 to 20 mol %, very preferably 15 to 20 mol %, and more particularly 18 to 20 mol %, (a6) up to 10 mol %, preferably up to 8 mol %, more preferably up to 5 mol %, very preferably up to 2 mol %. and more particularly 0 mol %, based in each case on the isocyanate-reactive groups, with the proviso that the sum of all isocyanate-reactive groups is 80 to 125 mol % of the reactive isocyanate groups in (a1) (in total), preferably 85 to 115 mol %, more preferably 90 to 110 mol %, very preferably 95 to 105 mol %, and more particularly 100 mol %.

For the preparation of the polyurethanes, the starting components (a1) to (a6) where used, are reacted with one another at temperatures of 40 to 180° C., preferably 50 to 150° C., while observing the NCO/OH equivalents ratio indicated above.

The reaction generally takes place until the desired NCO number in accordance with DIN 53185 has been reached.

The reaction time is generally 10 minutes to 12 hours, preferably 15 minutes to 10 hours, more preferably 20 minutes to 8 hours, and very preferably 1 to 8 hours.

To accelerate the reaction it is possible optionally to use suitable catalysts.

The formation of the adduct from isocyanate-group-containing compound and the compound which comprises groups reactive toward isocyanate groups is generally accomplished by mixing the components in any order, optionally at elevated temperature.

It is preferred here to add the compound that comprises groups reactive toward isocyanate groups to the isocyanate-group-containing compound, more preferably in a plurality of steps.

With particular preference, the isocyanate-group-containing compound is introduced and the compounds comprising isocyanate-reactive groups are added. More particularly, first of all, the isocyanate-group-containing compound (a1) is added, and then (a2) and subsequently (a5) are added, or, preferably, first of all the isocyanate-group-containing compound (a1) is introduced, then (a5) and subsequently (a2) are added. After that it is possible optionally to add further components desired.

It is of course also possible to add (a2) and (a5) in a mixture with one another.

Components (B) and (C)

The mixture of the 3-vinyl-imidazol-1-ium compound (X) optionally comprises at least one hydrophilic reactive diluent (B) and also, optionally, at least one further reactive diluent (C), which is different from (B).

Compounds (B) and (C) are compounds of the kind typically used as reactive diluents. These include, for example, the reactive diluents as described in P. K. T. Oldring (editor), Chemistry & Technology of UV & EB Formulations for Coatings, Inks & Paints, Vol. II, Chapter III: Reactive Diluents for UV & EB Curable Formulations, Wiley and SITA Technology, London 1997.

Examples of reactive diluents include esters of (meth) acrylic acid with alcohols which have 1 to 20 C atoms, e.g., methyl (meth)acrylate, ethyl (meth)acrylate, butyl (meth) acrylate, 2-ethylhexyl (meth)acrylate, 2-hydroxyethyl (meth) acrylate, 2-hydroxypropyl (meth)acrylate, 4-hydroxybutyl acrylate, dihydrodicyclopentadienyl acrylate.

Compounds having at least two free-radically polymerizable C═C double bonds: these include, in particular, the diesters and polyesters of the aforementioned α,β-ethylenically unsaturated monocarboxylic and/or dicarboxylic acids with diols or polyols. Particularly preferred are hexanediol diacrylate, hexanediol dimethacrylate, octanediol diacrylate, octanediol dimethacrylate, nonanediol diacrylate, nonanediol dimethacrylate, decanediol diacrylate, decanediol dimethacrylate, pentaerythritol diacrylate, dipentaerythritol tetraacrylate, dipentaerythritol triacrylate, pentaerythritol tetraacrylate, etc. Also preferred are the esters of alkoxylated polyols with α,β-ethylenically unsaturated monocarboxylic and/or dicarboxylic acids, such as, for example, the polyacrylates or polymethacrylates of alkoxylated trimethylolpropane, glycerol or pentaerythritol. Additionally suitable are the esters of alicyclic diols, such as cyclohexanediol di(meth)acrylate and bis(hydroxymethylethyl) cyclohexane di(meth)acrylate. Further suitable reactive diluents are trimethylolpropane monoformal acrylate, glycerol formal acrylate, 4-tetrahydropyranyl acrylate, 2-tetrahydropyranyl methacrylate, and tetrahydrofurfuryl acrylate.

Further suitable reactive diluents are, for example, polyether (meth)acrylates.

Polyether (meth)acrylates are preferably (meth)acrylates of singly to vigintuply and more preferably triply to decuply ethoxylated, propoxylated or mixedly ethoxylated and propoxylated, and more particularly exclusively ethoxylated, neopentylglycol, trimethylolpropane, trimethylolethane or pentaerythritol.

It is possible, furthermore, to use singly to vigintuply and more preferably triply to decuply ethoxylated, propoxylated or mixedly ethoxylated and propoxylated, and more particularly exclusively ethoxylated, glycerol.

Preferred polyfunctional, polymerizable compounds are ethylene glycol diacrylate, 1,2-propanediol diacrylate, 1,3-propanediol diacrylate, 1,4-butanediol diacrylate, 1,6-hexanediol diacrylate, trimethylolpropane triacrylate, pentaerythritol tetraacrylate, polyesterpolyol acrylates, polyetherol acrylates, and triacrylate of singly to vigintuply alkoxylated, more preferably ethoxylated, trimethylolpropane.

Polyether (meth)acrylates may also be (meth)acrylates of polyTHF having a molar weight between 162 and 2000, poly-1,3-propanediol having a molar weight between 134 and 2000 or polyethylene glycol having a molar weight between 238 and 2000.

The compound (B) which is present in accordance with the invention is a hydrophilic reactive diluent, the term "hydrophilic" in the context of this specification being understood to mean that it has a calculated log P value of not more than 1.0, the calculation of the log P values taking place with the program ACD/PhysChem Suite, Version 12.01 from Advanced Chemistry Development, Inc. (ACD/Labs, Ontario, Canada). The structures of the compounds for calculation are input in two-dimensional form in this case.

The compounds (B) are preferably selected from the group consisting of hydroxyalkyl (meth)acrylates and N-vinyl lactams, and more preferably are hydroxyalkyl (meth)acrylates Hydroxyalkyl (meth)acrylates as compounds (B) are preferably ω-hydroxyalkyl (meth)acrylates or (ω-1)-hydroxyalkyl (meth)acrylates, preferably ω-hydroxyalkyl (meth) acrylates.

Particularly preferred hydroxyalkyl (meth)acrylates (B) are those of the formula

in which $R^9$ is hydrogen or methyl, preferably hydrogen, and $R^8$ is a divalent hydrocarbon radical having 2 to 10, preferably 2 to 6, more preferably 2 to 4 carbon atoms.

Preferred radicals $R^8$ are, for example, linear or branched alkylene, e.g., 1,2-ethylene, 1,2- or 1,3-propylene, 1,2-, 1,3- or 1,4-butylene, 1,1-dimethyl-1,2-ethylene or 1,2-dimethyl-1,2-ethylene, 1,5-pentylene, 1,6-hexylene, 1,8-octylene, 1,10-decylene, or 1,12-dodecylene. Preference is given to 1,2-ethylene, 1,2- or 1,3-propylene, 1,4-butylene, and 1,6-hexylene, particular preference to 1,2-ethylene, 1,2- or 1,3-propylene, very particular preference to 1,2-ethylene and 1,2-propylene, and, more particularly, 1,2-ethylene.

The compound (B) is preferably 2-hydroxyethyl acrylate, 2-hydroxypropyl acrylate, 3-hydroxypropyl acrylate, 2-hydroxypropyl methacrylate, 2-hydroxyethyl methacrylate or 4-hydroxybutyl acrylate, more preferably 2-hydroxyethyl acrylate, 2-hydroxypropyl acrylate, 2-hydroxypropyl methacrylate, or 2-hydroxyethyl methacrylate, and very preferably 2-hydroxyethyl acrylate, 2-hydroxypropyl acrylate or 2-hydroxyethyl methacrylate.

N-Vinyl lactams as compounds (B) are preferably N-vinylated lactams having five- to twelve-membered ring systems, preferably five- to ten-membered and more preferably five- to seven-membered ring systems.

Preferred N-vinyl lactams are those of the formula

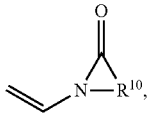

in which $R^{10}$ is a divalent hydrocarbon radical having 2 to 10, preferably 2 to 6, more preferably 3 to 5 carbon atoms.

Preferred radicals $R^{11}$ are, for example, linear or branched alkylene, e.g. 1,2-ethylene, 1,2- or 1,3-propylene, 1,2-, 1,3- or 1,4-butylene, 1,1-dimethyl-1,2-ethylene or 1,2-dimethyl-1,2-ethylene, 1,5-pentylene, 1,6-hexylene, 1,8-octylene or 1,10-decylene. Preference is given to 1,3-propylene, 1,4-butylene, 1,5-pentylene, 1,5-hexylene, and 1,6-hexylene, particular preference to 1,3-propylene, 1,4-butylene, and 1,5-pentylene, very particular preference to 1,3-propylene and 1,5-pentylene.

Preferred N-vinyl lactams as compounds (B) are N-vinylpyrrolidone or N-vinylcaprolactam.

Compound (B) may be a single compound or a mixture of two or more, up to four for example, preferably up to three compounds, more preferably one or two compounds, and very preferably just one compound.

Optionally there may be at least one reactive diluent (C) present, which is not a hydrophilic reactive diluent, i.e., is different from the reactive diluent (B), and preferably has a log P of more than 1.

Particularly preferred compounds (C) are polyfunctional (meth)acrylates, in other words having a functionality of at least 2, 2 to 10 for example, preferably 2 to 6, more preferably 2 to 5, and very preferably 2 to 4.

Compounds (C) of the kind used typically as reactive diluents are known per se to the skilled person. They include, for example, the reactive diluents as described in P. K. T. Oldring (editor), Chemistry & Technology of UV & EB Formulations for Coatings, Inks & Paints, Vol. II, Chapter III: Reactive Diluents for UV & EB Curable Formulations, Wiley and SITA Technology, London 1997.

Compounds having at least two free-radically polymerizable C=C double bonds: these include, in particular, the diesters and polyesters of (meth)acrylic acid with diols or polyols. Particularly preferred are 1,4-butanediol di(meth)acrylate, 1,6-hexanediol diacrylate, hexanediol dimethacrylate, octanediol diacrylate, octanediol dimethacrylate, nonanediol diacrylate, nonanediol dimethacrylate, decanediol diacrylate, decanediol dimethacrylate, diethylene glycol di(meth)acrylate, triethylene glycol di(meth)acrylate, dipropylene glycol di(meth)acrylate, tripropylene glycol di(meth)acrylate, pentaerythritol diacrylate, dipentaerythritol tetraacrylate, dipentaerythritol triacrylate, pentaerythritol tetraacrylate, etc.

Also preferred are the esters of alkoxylated polyols with (meth)acrylic acid, such as the polyacrylates or polymethacrylates of, on average per OH group, singly to decuply, preferably singly to pentuply, more preferably singly to triply, and very preferably singly to doubly alkoxylated, for example ethoxylated and/or propoxylated, preferably ethoxylated or propoxylated, and more preferably exclusively ethoxylated, trimethylolpropane, glycerol or pentaerythritol.

Additionally suitable are the esters of alicyclic diols, such as cyclohexanediol di(meth)acrylate and bis(hydroxymethylethyl)cyclohexane di(meth)acrylate.

Further suitable reactive diluents are for example epoxy (meth)acrylates, polyether (meth)acrylates, polyester (meth)acrylates or polycarbonate (meth)acrylates.

Epoxy (Meth)Acrylates

Epoxy (meth)acrylates are preferably obtainable by reacting epoxides with (meth)acrylic acid. Examples of suitable epoxides include epoxidized olefins, aromatic glycidyl ethers or aliphatic glycidyl ethers, preferably those of aromatic or aliphatic glycidyl ethers.

Examples of possible epoxidized olefins include ethylene oxide, propylene oxide, isobutylene oxide, 1-butene oxide, 2-butene oxide, vinyloxirane, styrene oxide or epichlorohydrin, preference being given to ethylene oxide, propylene oxide, isobutylene oxide, vinyloxirane, styrene oxide or epichlorohydrin, particular preference to ethylene oxide, propylene oxide or epichlorohydrin, and very particular preference to ethylene oxide and epichlorohydrin.

Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g., 2,5-bis[(2,3-epoxypropoxy)phenyl]octahydro-4,7-methano-5H-indene (CAS No. [13446-85-0]), tris[4-(2,3-epoxypropoxy)phenyl]-methane isomers (CAS No. [66072-39-7]), phenol-based epoxy novolaks (CAS No. [9003-35-4]), and cresol-based epoxy novolaks (CAS No. [37382-79-9]).

Preference is given to bisphenol A diglycidyl ether, bisphenol F diglycidyl ether, bisphenol B diglycidyl ether, and bisphenol S diglycidyl ether, and bisphenol A diglycidyl ether is particularly preferred.

Examples of aliphatic glycidyl ethers include 1,4-butanediol diglycidyl ether, 1,6-hexanediol diglycidyl ether, trimethylolpropane triglycidyl ether, pentaerythritol tetraglycidyl ether, 1,1,2,2-tetrakis[4-(2,3-epoxypropoxy)phenyl]ethane (CAS No. [27043-37-4]), diglycidyl ether of polypropylene glycol (α,ω-bis(2,3-epoxypropoxy)poly(oxypropylene) (CAS No. [16096-30-3]) and of hydrogenated bisphenol A (2,2-bis[4-(2,3-epoxypropoxy)cyclohexyl]propane, CAS No. [13410-58-7]).

Preference is given to 1,4-butanediol diglycidyl ether, 1,6-hexanediol diglycidyl ether, trimethylolpropane triglycidyl ether, pentaerythritol tetraglycidyl ether, and 2,2-bis[4-(2,3-epoxypropoxy)cyclohexyl]propane.

The abovementioned aromatic glycidyl ethers are particularly preferred.

The epoxy (meth)acrylates and epoxy vinyl ethers preferably have a number-average molar weight $M_n$ of 200 to 20 000, more preferably of 200 to 10 000 g/mol, and very preferably of 250 to 3000 g/mol; the amount of (meth)acrylic or vinyl ether groups is preferably 1 to 5, more preferably 2 to 4, per 1000 g of epoxy (meth)acrylate or vinyl ether epoxide (determined by gel permeation chromatography using polystyrene as standard and tetrahydrofuran as eluent).

Preferred epoxy (meth)acrylates have an OH number of 40 to 400 mg KOH/g.

Preferred epoxy (meth)acrylates have an average OH functionality of 1.5 to 4.5.

Particularly preferred epoxy (meth)acrylates are those such as are obtained from processes in accordance with EP-A-54 105, DE-A 33 16 593, EP-A 680 985, and EP-A-279 303, in which in a first stage a (meth)acrylic ester is prepared from (meth)acrylic acid and hydroxy compounds and in a second stage excess (meth)acrylic acid is reacted with epoxides.

Polyester (Meth)Acrylates

Suitable polyester (meth)acrylates are at least partly or, preferably, completely (meth)acrylated reaction products of polyesterols of the kind listed above under compounds a4).

Carbonate (Meth)Acrylates

Carbonate (meth)acrylates comprise on average preferably 1 to 5, especially 2 to 4, more preferably 2 to 3 (meth)acrylic groups, and very preferably 2 (meth)acrylic groups.

The number-average molecular weight $M_n$ of the carbonate (meth)acrylates is preferably less than 3000 g/mol, more preferably less than 1500 g/mol, very preferably less than 800 g/mol (determined by gel permeation chromatography using polystyrene as standard, tetrahydrofuran as solvent).

The carbonate (meth)acrylates are obtainable in a simple manner by transesterifying carbonic esters with polyhydric, preferably dihydric, alcohols (diols, hexanediol for example) and subsequently esterifying the free OH groups with (meth)acrylic acid, or else by trans-esterification with (meth)acrylic esters, as described for example in EP-A 92 269. They are also obtainable by reacting phosgene, urea derivatives with polyhydric, e.g., dihydric, alcohols.

Also conceivable are (meth)acrylates or vinyl ethers of polycarbonate polyols, such as the reaction product of one of the aforementioned diols or polyols and a carbonic ester and also a hydroxyl-containing (meth)acrylate or vinyl ether.

Examples of suitable carbonic esters include ethylene carbonate, 1,2- or 1,3-propylene carbonate, dimethyl carbonate, diethyl carbonate or dibutyl carbonate.

Examples of suitable hydroxyl-containing (meth)acrylates are 2-hydroxyethyl (meth)acrylate, 2- or 3-hydroxypropyl (meth)acrylate, 1,4-butanediol mono(meth)acrylate, neopentylglycol mono(meth)acrylate, glyceryl mono- and di(meth)acrylate, trimethylolpropane mono- and di(meth)acrylate, and pentaerythrityl mono-, di-, and tri(meth)acrylate.

Suitable hydroxyl-containing vinyl ethers are, for example, 2-hydroxyethyl vinyl ether and 4-hydroxybutyl vinyl ether.

Particularly preferred carbonate (meth)acrylates are those of the formula:

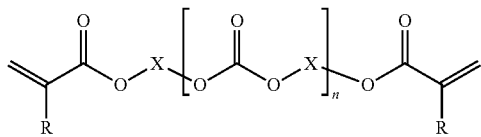

in which R is H or $CH_3$, X is a $C_2$-$C_{18}$ alkylene group, and n is an integer from 1 to 5, preferably 1 to 3.

R is preferably H and X is preferably $C_2$ to $C_{10}$ alkylene, examples being 1,2-ethylene, 1,2-propylene, 1,3-propylene, 1,4-butylene, and 1,6-hexylene, more preferably $C_4$ to $C_8$ alkylene. With very particular preference X is $C_6$ alkylene.

The carbonate (meth)acrylates are preferably aliphatic carbonate (meth)acrylates.

They further include customary polycarbonates known to the skilled person and having terminal hydroxyl groups, which are obtainable, for example, by reacting the aforementioned diols with phosgene or carbonic diesters.

Polyether (Meth)Acrylates

Polyether (meth)acrylates are preferably (meth)acrylates of singly to vigintuply and more preferably triply to decuply ethoxylated, propoxylated or mixedly ethoxylated and propoxylated, and more particularly exclusively ethoxylated, neopentylglycol, trimethylolpropane, trimethylolethane or pentaerythritol.

In addition it is possible to use singly to vigintuply and more preferably triply to decuply ethoxylated, propoxylated or mixedly ethoxylated and propoxylated, and more particularly exclusively ethoxylated, glycerol.

Preferred polyfunctional, polymerizable compounds are ethylene glycol diacrylate, 1,2-propanediol diacrylate, 1,3-propanediol diacrylate, 1,4-butanediol diacrylate, 1,6-hexanediol diacrylate, trimethylolpropane triacrylate, pentaerythrityl tetraacrylate, polyesterpolyol acrylates, polyetherol acrylates, and triacrylate of singly to vigintuply alkoxylated, more preferably ethoxylated, trimethylolpropane.

Polyether (meth)acrylates may further be (meth)acrylates of polyTHF having a molar weight between 162 and 2000, poly-1,3-propanediol having a molar weight between 134 and 2000, or polyethylene glycol having a molar weight between 238 and 2000.

In one preferred embodiment of the present invention there is no compound (C) present.

Where the coatings of the invention are cured not with electron beams but instead by means of UV radiation, the preparations of the invention preferably comprise at least one photoinitiator (D) which is able to initiate the polymerization of ethylenically unsaturated double bonds.

Photoinitiators (D) may be, for example, photoinitiators known to the skilled person, examples being those specified in "Advances in Polymer Science", Volume 14, Springer Berlin 1974 or in K. K. Dietliker, Chemistry and Technology of UV and EB Formulation for Coatings, Inks and Paints, Volume 3; Photoinitiators for Free Radical and Cationic Polymerization, P. K. T. Oldring (Eds), SITA Technology Ltd, London.

Suitability is possessed by those photoinitiators as described in WO 2006/005491 A1, page 21 line 18 to page 22 line 2 (corresponding to US 2006/0009589 A1, paragraph [0150]), which is hereby considered part of the present disclosure through reference.

Also suitable are nonyellowing or low-yellowing photoinitiators of the phenylglyoxalic ester type, as described in DE-A 198 26 712, DE-A 199 13 353 or WO 98/33761.

Typical mixtures comprise, for example, 2-hydroxy-2-methyl-1-phenylpropan-2-one and 1-hydroxycyclohexyl phenyl ketone, bis(2,6-dimethoxybenzoyl)-2,4,4-trimethylpentylphosphine oxide and 2-hydroxy-2-methyl-1-phenylpropan-1-one, benzophenone and 1-hydroxycyclohexyl phenyl ketone, bis(2,6-dimethoxybenzoyl)-2,4,4-trimethylpentylphosphine oxide and 1-hydroxycyclohexyl phenyl ketone, 2,4,6-trimethylbenzoyldiphenylphosphine oxide and 2-hydroxy-2-methyl-1-phenylpropan-1-one, 2,4,6-trimethylbenzophenone and 4-methylbenzophenone or 2,4,6-trimethylbenzophenone, and 4-methylbenzophenone and 2,4,6-trimethylbenzoyldiphenylphosphine oxide.

Preference among these photoinitiators is given to 2,4,6-trimethylbenzoyldiphenylphosphine oxide, ethyl 2,4,6-trimethylbenzoylphenylphosphinate, bis(2,4,6-trimethylbenzoyl)phenylphosphine oxide, benzophenone, 1-hydroxycyclohexyl phenyl ketone, 1-benzoylcyclohexan-1-ol, 2-hydroxy-2,2-dimethylacetophenone, 2,2-dimethoxy-2-phenylacetophenone, and mixtures thereof.

The coatings of the invention comprise the photoinitiators (D) preferably in an amount of 0.05% to 10%, more preferably 0.1% to 8%, in particular 0.2% to 5%, by weight based on the total amount of the radiation-curable compounds (A) and (B) and also optionally (C).

The coatings of the invention may comprise further customary coatings additives (E), such as flow control agents, defoamers, UV absorbers, sterically hindered amines (HALS), plasticizers, antisettling agents, dyes, pigments, antioxidants, activators (accelerants), antistatic agents, flame retardants, thickeners, thixotropic agents, surface-active agents, viscosity modifiers, plastifying agents or chelating agents and/or fillers.

The coatings of the invention may comprise 0% to 20% by weight, based on the sum of the compounds (A) and (B) and also optionally (C), of at least one compound (E).

Suitable stabilizers comprise typical UV absorbers such as oxanilides, triazines, preferably hydroxyphenyltriazine, and benzotriazole (the latter obtainable as Tinuvin® products from Ciba Spezialitätenchemie) and benzophenones.

These stabilizers can be used alone or together with, based on the sum of compounds (A) and (B) and also optionally (C), additionally 0% to 5% by weight of suitable free-radical scavengers, examples being sterically hindered amines such as 2,2,6,6-tetramethylpiperidine, 2,6-di-tert-butylpiperidine or derivatives thereof, e.g., bis(2,2,6,6-tetramethyl-4-piperidyl)sebacate or preferably bis(1,2,2,6,6-pentamethyl-4-piperidyl)sebacate.

Additionally it is possible for one or more thermally activatable initiators to be added, examples being potassium peroxodisulfate, dibenzoyl peroxide, cyclohexanone peroxide, di-tert-butyl peroxide, azobisisobutyronitrile, cyclohexylsulfonyl acetyl peroxide, diisopropyl percarbonate, tert-butyl peroctoate or benzpinacol, and also, for example, those thermally activatable initiators which have a half-life at 80° C. of more than 100 hours, such as di-tert-butyl peroxide, cumene hydroperoxide, dicumyl peroxide, tert-butyl perbenzoate, silylated pinacols, which are available commercially, for example, under the trade name ADDID 600 from Wacker, or amine N-oxides containing hydroxyl groups, such as 2,2,6,6-tetramethylpiperidine-N-oxyl, 4-hydroxy-2,2,6,6-tetramethylpiperidine-N-oxyl, etc.

Further examples of suitable initiators are described in "Polymer Handbook", 2nd ed., Wiley & Sons, New York.

Thickeners contemplated are, besides free-radically (co) polymerized (co)polymers, customary organic and inorganic thickeners such as hydroxymethylcellulose or bentonite.

Examples of chelating agents which can be used include ethylenediamineacetic acid and salts thereof, and also β-diketones.

Suitable fillers comprise silicates, e.g., silicates obtainable by hydrolysis of silicon tetrachloride, such as Aerosil R from Degussa, siliceous earth, talc, aluminum silicates, magnesium silicates, calcium carbonates, etc. Suitable stabilizers comprise typical UV absorbers such as oxanilides, triazines, and benzotriazole (the latter obtainable as Tinuvin R products from Ciba Spezialitätenchemie), and benzophenones. They can be used alone or together with suitable free-radical scavengers, examples being sterically hindered amines such as 2,2,6,6-tetramethylpiperidine, 2,6-di-tert-butylpiperidine or derivatives thereof, e.g., bis(2,2,6,6-tetramethyl-4-piperidyl) sebacate. Stabilizers are used preferably in amounts of 0.1% to 5.0% by weight, based on the "solid" components comprised in the preparation.

The antimicrobial, radiation-curable coating compositions of the invention generally have the following composition in % by weight:
(A) 0 to 95, preferably 0 to 90, very preferably 50 to 80% by weight,
(B) 0 to 90, preferably 5 to 50, very preferably 10 to 40% by weight,
(C) 0 to 30, preferably 0 to 20, more preferably 0 to 10, and very preferably 0% by weight,
(D) 0 to 10, preferably 0.05 to 10, more preferably 0.1 to 8, more particularly 0.2 to 5% by weight,
(E) 0 to 20, preferably 0 to 10, more preferably 0 to 1% by weight,
(X) 1 to 99, preferably 5 to 80, very preferably 10 to 50% by weight,
  wherein at least one of the components (A) and (B) is present, preferably both components (A) and (B), very preferably components (A), (B), and (D), and especially preferably components (A), (B), (D), and (E),
  with the proviso that the total is always 100% by weight.

According to the invention in the antimicrobial, radiation-curable coating compositions either component (A) or component (B) are present in at least 1% by weight, preferably both components (A) and (B) are present in at least 1% by weight, very preferably both components (A) and (B) are present in at least 1% by weight and component (D) in at least 0.05% by weight, and especially preferably both components (A) and (B) are present in at least 1% by weight, component (D) in at least 0.05% by weight, and component (E) in at least 0.1% by weight.

The coatings of the invention are particularly suitable for coating substrates such as wood, paper, textile, leather, nonwoven, plastics surfaces, glass, ceramic, mineral building materials, such as cement moldings and fiber-cement slabs, and, in particular, metals or coated metals. Preference is given to the coating of steel, especially medical steel, and plastics, more particularly acrylonitrile-butadiene-styrene (ABS) and polycarbonate (PC) plastics.

The antimicrobial, radiation-curable coatings of the invention are suitable with particular advantage for the coating of medical devices and articles, examples being laboratory tables, operating tables, work surfaces. and device surfaces.

The substrates are coated in accordance with customary methods that are known to the skilled person, involving the application of at least one coating composition having the constitution described above to the substrate that is to be coated, in the desired thickness, and the removal from the coating composition of any volatile constituents present. This process can be repeated one or more times if desired. Application to the substrate may take place in a known way, e.g., by spraying, troweling, knifecoating, brushing, rolling, rollercoating or pouring. The coating thickness is generally situated within a range from about 3 to 1000 g/m² and preferably 10 to 200 g/m².

To remove the volatile constituents present in the coating composition, the coating can optionally be dried following application to the substrate, drying taking place for example in a tunnel oven or by flashing off. Drying can also take place by means of NIR radiation, NIR radiation here meaning electromagnetic radiation in the wavelength range from 760 nm to 2.5 µm, preferably from 900 to 1500 nm.

Optionally, if two or more films of the coating material are applied one on top of another, a radiation cure may take place after each coating operation.

Radiation curing is accomplished by exposure to high-energy radiation, i.e., UV radiation or daylight, preferably light with a wavelength of 250 to 600 nm, or by irradiation with high-energy electrons (electron beams; 150 to 300 keV). Examples of radiation sources used include high-pressure mercury vapor lamps, lasers, pulsed lamps (flash light), halogen lamps or excimer emitters. The radiation dose normally sufficient for crosslinking in the case of UV curing is situated within the range from 80 to 3000 mJ/cm$^2$.

Irradiation may also optionally be carried out in the absence of oxygen, e.g., under an inert gas atmosphere. Suitable inert gases include, preferably, nitrogen, noble gases, carbon dioxide or combustion gases. Irradiation may also take place with the coating composition being covered by transparent media. Transparent media are, for example, polymeric films, glass or liquids, e.g., water. Particular preference is given to irradiation in the manner as is described in DE-A1 199 57 900.

In one preferred process, curing takes place continuously, by passing the substrate treated with the preparation of the invention at constant speed past a radiation source. For this it is necessary for the cure rate of the preparation of the invention to be sufficiently high.

This varied course of curing over time can be exploited in particular when the coating of the article is followed by a further processing step in which the film surface comes into direct contact with another article or is worked on mechanically.

The invention is illustrated in more detail by means of the following, nonlimiting examples.

EXAMPLES

Unless indicated otherwise, parts and percentages indicated are by weight.

Determination of antimicrobial activity by fluorescence microscopy

1. Bacterial Culture:

50 ml of DSM 92 medium (=TSBY Medium, Deutsche Sammlung von Mikroorganismen and Zellkulturen GmbH) in an Erlenmeyer flask with chicane are inoculated with a single colony of *Staphylococcus aureus* ATCC 6538P and incubated at 190 rpm and 37° C. for 16 hours. The resulting preliminary culture has a cell density of approximately 10$^8$ CFU/ml, corresponding to an optical density of OD=7.0-8.0. Using this preliminary culture, 15 ml of main culture in 5% DSM 92 medium with an optical density of OD=1.0 are prepared.

Analogous cultures are prepared for testing with

*E. coli* ATCC=8739: preliminary culture 100% DSM 1 medium (nutrient medium without agar), main culture 5% DSM 1 medium

*S. faecalis* ATCC=11700: preliminary culture 100% DMS 53 medium (Corynebacterium medium without agar), main culture 5% DSM 53 medium

*P. aeruginosa* ATCC=15442 (incubation at 30° C.): preliminary culture 100% DSM 546 medium (LC medium), main culture 10% DSM 546 medium 2. Fluorescence Staining:

500 µl of the main bacterial culture are stained in accordance with the manufacturer recommendation using 1.5 µl of Syto 9 fluorescent dye and 1.5 µl of propidium iodide fluorescent dye (Film Tracer™ LIVE/DEAD® Biofilm Viability Kit, from Invitrogen). 10 µl of this bacterial suspension are applied to the surface under investigation, and covered with a cover slip. A homogeneous film of liquid is formed, with a thickness of about 30 µm. The test substrates are incubated in the dark at 37° C. for up to 2 hours. After this time, >95% living bacterial cells are found on untreated reference substrates (including pure glass).

3. Microscopy:

The test substrates are examined under a Leica DMI6000 B microscope with the cover slip facing the lens. Each test substrate is advanced automatically to 15 pre-defined positions, and images are recorded in the three channels of phase contrast (P), red (R) and green (G). The absorbance and emission wavelengths in the fluorescence channels are adapted to the dyes used. Bacteria with an intact cell membrane (living) are detected in the green channel, bacteria with a defective cell membrane (dead) are detected in the red channel. The total of all the bacteria is detected in the phase contrast channel. For each of the 15 positions, the number of bacteria in all 3 channels is counted. The percentage of dead bacteria is calculated either from the numbers in R/(R+G) or, if background fluorescence is observed in the green channel, from R/P. The percentage of dead bacteria is averaged over the 15 positions and reported as the result.

Preparation of Urethane Acrylate UA1:

500 parts of a trifunctional isocyanurate based on 1,6-hexamethylene diisocyanate (Basonat® HI100, BASF SE), 230 parts of hydroxyethyl acrylate, 2 parts of methylhydroquinone and 0.1 part of dibutyltin dilaurate were combined at room temperature and the reaction temperature was maintained by cooling and heating for 3 hours within a range from 80° C. to 85° C. The mixture was diluted with 150 parts of butyl acetate and the temperature was lowered to 50° C. Then 116 parts of aminopropyltriethoxysilane were added over the course of 60 minutes and reaction was allowed to continue for 3 hours. The result was a colorless urethane acrylate resin having an NCO (isocyanate) value <0.1%.

Preparation of Urethane Acrylate UA2:

150 parts of a trifunctional isocyanurate based on 1,6-hexamethylene diisocyanate (Basonat® HI100, BASF SE), 75 parts of hydroxyethyl acrylate, 2 parts of methylhydroquinone and 0.1 part of dibutyltin dilaurate were combined at room temperature and the reaction temperature was maintained by cooling and heating for 8 hours within a range from 80° C. to 85° C. The result was a colorless urethane acrylate resin having an NCO (isocyanate) value <0.1%. The mixture was diluted with 150 parts of dipropylenglycol diacrylate resulting in a viscosity of the formulation of 3.9 Pas.

Examples 1-4

100 parts of the urethane acrylate UA1, the parts of butanediol monoacrylate indicated in the table, and the parts indicated in the table of 1-hexadecyl-3-vinyl-imidazol-1-ium bromide were admixed with 2 parts of Irgacure® 500 and 1 part of a mixture of aluminium sec-butylate and ethyl acetoacetate (weight ratio 2.04:1.3), applied to slides in a dry film thickness of approximately 25 µm, cured under a nitrogen atmosphere in an IST exposure unit at about 1400 mJ/cm$^2$, followed by thermal curing for 30 minutes at 100° C.

| Example | Parts 1-hexadecyl-3-vinyl-imidazol-1-ium bromid | Parts of butanediol monoacrylate | % kill of S. aureus ATCC 6538P after 2 hours (fluorescence microscopy) |
|---|---|---|---|
| 1 | 0 | 36 | 1 ± 1 |
| 2 | 5 | 31 | 97 ± 3 |
| 3 | 10 | 26 | 100 |
| 4 | 20 | 16 | 100 |

Example 5

70 parts of the urethane acrylate UA2, 20 parts of butanediol monoacrylate and 10 parts of hexadecyl-3-vinyl-imidazol-1-ium bromide were admixed with 2 parts of Irgacure® 500 and 1 part of a mixture of aluminium sec-butylate and ethyl acetoacetate (weight ratio 2.04:1.3), applied to slides in a dry film thickness of approximately 25 μm and cured under a nitrogen atmosphere in an IST exposure unit at about 1400 mJ/cm².

% kill of S. aureus ATCC 6538P after 2 hours (fluorescence microscopy): 98±2

Example 6

70 parts of pentaerythritol triacrylate, 20 parts of butanediol monoacrylate and 10 parts of hexadecyl-3-vinyl-imidazol-1-ium bromide were admixed with 2 parts of Irgacure® 500, applied to slides in a dry film thickness of approximately 25 μm and cured under a nitrogen atmosphere in an IST exposure unit at about 1400 mJ/cm².

% kill of S. aureus ATCC 6538P after 2 hours (fluorescence microscopy): 100

Example 7

70 parts of pentaerythritol triacrylate, 20 parts of butanediol monoacrylate, 5 parts of hexadecyl-3-vinyl-imidazol-1-ium bromide and 5 parts of octadecyl-dimethyl-(trimethoxysilyl)propyl ammonium chloride were admixed with 2 parts of Irgacure® 500 and 1 part of a mixture of aluminium sec-butylate and ethyl acetoacetate (weight ratio 2.04:1.3), applied to slides in a dry film thickness of approximately 25 μm, cured under a nitrogen atmosphere in an IST exposure unit at about 1400 mJ/cm², followed by thermal curing for 30 minutes at 100° C.

% kill of S. aureus ATCC 6538P after 2 hours (fluorescence microscopy): 100

The invention claimed is:

1. An antimicrobial, radiation-curable coating obtained by reacting:
(X) a 3-vinyl-imidazol-1-ium compound of formula

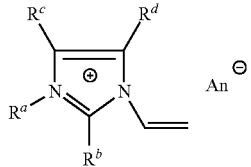

wherein
$R^a$ is an organic radical having 1 to 22 C atoms,
$R^b$, $R^c$ and $R^d$ are each independently of one another an H atom or an organic radical having up to 22 C atoms and An– is an anion,
with a urethane methacrylate (A), or reacting (X) with a hydrophilic reactive diluent (B), or reacting (X) with both the urethane methacrylate (A) and the hydrophilic reactive diluent (B), wherein
(A) is a urethane (meth)acrylate comprising a (meth)acrylate group and optionally a quaternary ammonium group, substituted by four radicals which have in total at least 12 carbon atoms, and
(B) is a hydrophilic reactive diluent,
and optionally reacting (X) with one or more members selected from the group consisting of (C), (D) and (E):
(C) a reactive diluent other than the hydrophilic reactive diluent (B),
(D) a photoinitiator, and
(E) another coatings additive.

2. The coating according to claim 1, wherein $R^a$ is a $C_4$ to $C_{22}$ alkyl group.

3. The coating according to claim 1, wherein $R^a$ is selected from the group consisting of butyl, hexyl, octyl, decyl, dodecyl, tetradecyl, hexadecyl, and octadecyl group.

4. The coating according to claim 1, wherein the 3-vinyl-imidazol-1-ium compound (X) is selected from the group consisting of 1-butyl-3-vinyl-imidazol-1-ium, 1-hexyl-3-vinyl-imidazol-1-ium, 1-octyl-3-vinyl-imidazol-1-ium, 1-decyl-3-vinyl-imidazol-1-ium, 1-dodecyl-3-vinyl-imidazol-1-ium, 1-tetradecyl-3-vinylimidazol-1-ium, 1-hexadecyl-3-vinyl-imidazol-1-ium, and 1-octadecyl-3-vinyl-imidazol-1-ium.

5. The coating according to, claim 1, wherein the quaternary ammonium group has formula (I)

$R^1R^2R^3N^+$—R4- wherein
$R^1$, $R^2$, and $R^3$ are each independently of one another alkyl groups having 1 to 20 carbon atoms, aryl groups having 6 to 14 carbon atoms or aralkyl groups having 7 to 20 carbon atoms, and optionally two of the radicals $R^1$ to $R^3$ together are part of a ring, and
$R^4$ is a divalent hydrocarbon radical having 1 to 10 carbon atoms.

6. The coating according to claim 5, wherein at least one of the radicals $R^1$, $R^2$, and $R^3$ has at least 10 carbon atoms.

7. The coating according to claim 1, wherein the urethane (meth)acrylate (A) comprises:
(a1) a diisocyanate or polyisocyanate,
(a2) a compound having a group that is reactive toward isocyanate groups, and a (meth)acrylate group,
(a3) optionally a low molecular mass compound having at least two groups that are reactive toward isocyanate groups,
(a4) optionally a high molecular mass compound having at least two groups that are reactive toward isocyanate groups,
(a5) optionally a compound having a group that is reactive toward isocyanate groups, and a quaternary ammonium group, and
(a6) optionally a compound having just one group that is reactive toward isocyanate groups.

8. The coating according to claim 7, wherein component (a5) is formed from a compound (a5a) which has a group that is reactive toward isocyanate groups, and a first reactive group, by reacting with a compound (a5b) which has a further reactive group, which is complementary to the first reactive group, and a quaternary ammonium group.

9. The coating according to claim 1, wherein the urethane (meth)acrylate (A) has an ammonium group density of at least 0.07 mol per 1000 g.

10. The coating according to claim 1, wherein the diluent (B) is selected from the group consisting of hydroxyalkyl (meth)acrylate and N-vinyl lactam.

11. The coating according to claim 1, wherein the diluent (B) is selected from the group consisting of 2-hydroxyethyl acrylate, 2-hydroxypropyl acrylate, 2-hydroxyethyl methacrylate, 4-hydroxybutyl acrylate, N-vinylpyrrolidone, and N-vinylcaprolactone.

12. The coating according to claim 1, having the following composition in % by weight:
    (A) 0 to 95;
    (B) 0 to 90;
    (C) 0 to 30;
    (D) 0 to 10;
    (E) 0 to 20; and
    (X) 1 to 99,
based on a total of 100% by weight.

13. A method for coating a substrate, the method comprising applying a coating according to claim 1 to wood, paper, textile, leather, nonwoven, plastics surfaces, glass, ceramic, mineral building materials, metals or coated metals.

14. A method for coating a substrate, comprising applying a coating according to claim 1 to medical devices and articles.

15. A method for the antimicrobial treatment of a substrate, comprising:
    applying a coating according to claim 1 to a substrate;
    optionally drying; and
    subsequently curing with high-energy radiation.

16. The coating according to claim 1, wherein both the urethane (meth)acrylate (A) and the hydrophilic reactive diluent (B) are present.

17. The coating according to claim 1, wherein the urethane (meth)acrylate (A), the hydrophilic reactive diluent (B), and the photoinitiator (D) are present.

18. The coating according to claim 1, wherein the urethane (meth)acrylate (A), the hydrophilic reactive diluent (B), the photoinitiator (D), and the other coatings additive (E) are present.

19. The coating according to claim 12, wherein both the urethane (meth)acrylate (A) and the hydrophilic reactive diluent (B) are present.

20. The coating according to claim 12, wherein the urethane (meth)acrylate (A), the hydrophilic reactive diluent (B), and the photoinitiator (D) are present.

* * * * *